(12) United States Patent
Dalpini et al.

(10) Patent No.: US 12,111,920 B2
(45) Date of Patent: Oct. 8, 2024

(54) SYSTEMS AND METHODS FOR DETECTION OF SYNTHETIC IDENTITY MALFEASANCE

(71) Applicant: BANK OF AMERICA CORPORATION, Charlotte, NC (US)

(72) Inventors: Nathan Alexander Dalpini, McKinney, TX (US); Tomas M. Castrejon, III, Fort Mill, SC (US); James J. Siekman, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 129 days.

(21) Appl. No.: 17/474,862

(22) Filed: Sep. 14, 2021

(65) Prior Publication Data

US 2023/0080885 A1    Mar. 16, 2023

(51) Int. Cl.
   *G06F 21/55* (2013.01)

(52) U.S. Cl.
   CPC ...... *G06F 21/552* (2013.01); *G06F 2221/034* (2013.01)

(58) Field of Classification Search
   CPC .......................... G06F 21/552; G06F 2221/034
   See application file for complete search history.

(56) References Cited

U.S. PATENT DOCUMENTS

| | | |
|---|---|---|
| 8,359,278 B2 | 1/2013 | Domenikos et al. |
| 8,484,132 B1 | 7/2013 | Christiansen et al. |
| 8,831,677 B2 | 9/2014 | Villa-Real |
| 9,166,987 B2 | 10/2015 | Sun |
| 9,230,280 B1 | 1/2016 | Maag et al. |
| 9,542,684 B2 | 1/2017 | Jeronimus et al. |
| 9,552,615 B2 | 1/2017 | Mathura et al. |
| 9,679,426 B1 | 6/2017 | Jones-McFadden et al. |

(Continued)

OTHER PUBLICATIONS

V. Mareeswari • S. Sundareswari; Data stream mining based resilient identity fraudulent detection; International Conference on Information Communication and Embedded Systems (ICICES2014) (2014, pp. 1-6); (Year: 2014).*

(Continued)

*Primary Examiner* — Luu T Pham
*Assistant Examiner* — Chao Wang
(74) *Attorney, Agent, or Firm* — Moore & Van Allen PLLC; Nicholas C. Russell (57) ABSTRACT

Systems, methods, and computer program products are provided for detecting a synthetic identity. The method includes receiving an identity verification request relating to an individual. The identity verification request includes one or more individual identifiers of the individual. The method also includes comparing at least one of the one or more individual identifiers to one or more known synthetic indicators. The one or more known synthetic indicators including at least one of a synthetic identifier type or a synthetic identifier value that correspond to one or more known synthetic identities. The method further includes determining a synthetic identity determination based on the comparison of the at least one of the one or more individual identifiers to the one or more known synthetic indicators. The synthetic identity determination indicates whether an identity verification request is a potential synthetic identity.

18 Claims, 5 Drawing Sheets

(56) References Cited

U.S. PATENT DOCUMENTS

| | | |
|---|---|---|
| 10,445,479 B2 | 10/2019 | Rao et al. |
| 10,693,872 B1* | 6/2020 | Larson .................. H04L 9/3231 |
| 10,805,342 B2 | 10/2020 | Cardinal et al. |
| 2004/0258281 A1 | 12/2004 | Delgrosso et al. |
| 2007/0291995 A1 | 12/2007 | Rivera |
| 2010/0293090 A1 | 11/2010 | Domenikos et al. |
| 2016/0012445 A1 | 1/2016 | Villa-Real |
| 2017/0301034 A1 | 10/2017 | Golasz |
| 2019/0190794 A1 | 6/2019 | McGrew et al. |
| 2019/0281086 A1* | 9/2019 | Sherif .................. H04L 63/1466 |
| 2019/0312895 A1* | 10/2019 | Fujimura ................ H04L 12/28 |
| 2020/0042723 A1 | 2/2020 | Krishnamoorthy et al. |
| 2020/0167784 A1 | 5/2020 | Kursun |
| 2020/0167786 A1 | 5/2020 | Kursun |
| 2020/0364366 A1 | 11/2020 | Kundu et al. |

OTHER PUBLICATIONS

Viktor Varkarakis • Shabab Bazrafkan • Gabriel Costache • Peter Corcoran; Validating Seed Data Samples for Synthetic Identities—Methodology and Uniqueness Metrics; IEEE Access (vol. 8, 2020, pp. 152532-152550); (Year: 2020).*

K. Veena • K. Meena; Determination of performance to verify the synthetic identity theft by training the neural networks; 2017 IEEE International Conference on Smart Technologies and Management for Computing, Communication, Controls, Energy and Materials (ICSTM) (2017, pp. 246-250); (Year: 2017).*

* cited by examiner

SYSTEMS AND METHODS FOR DETECTION OF SYNTHETIC IDENTITY MALFEASANCE

TECHNOLOGICAL FIELD

An example embodiment relates generally to detection of identity malfeasance, and more particularly, to providing detection and prevention of synthetic identity malfeasance.

BACKGROUND

Identity malfeasance is a large issue in today's virtual world. It is difficult to confirm the identity of a given user virtually and this allows for bad actors to use synthetic (or fake) identities to scam others. Unfortunately, there is no uniform way to determine whether an identity is real or synthetic. Instead, the private sector is required to individually verify an identity. Additionally, bad actors are constantly improving at creating synthetic identities that appear to be real identities and are therefore, difficult to detect. As such, there exists a need for a system that can increase the accuracy of synthetic identity detection.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for detecting a synthetic identity is provided. The system includes at least one non-transitory storage device and at least one processing device coupled to the at least one non-transitory storage device. The at least one processing device is configured to receive an identity verification request relating to an individual. The identity verification request includes one or more individual identifiers of the individual. The at least one processing device is also configured to compare at least one of the one or more individual identifiers to one or more known synthetic indicators. The one or more known synthetic indicators includes at least one of a synthetic identifier type or a synthetic identifier value that correspond to one or more known synthetic identities. The at least one processing device is further configured to determine a synthetic identity determination based on the comparison of the at least one of the one or more individual identifiers to the one or more known synthetic indicators. The synthetic identity determination indicates whether an identity verification request is a potential synthetic identity.

In some embodiments, the one or more known synthetic indicators are stored in a synthetic indicator landing zone. In such an embodiment, the synthetic indicator landing zone uses machine learning to create the one or more known synthetic indicators based on one or more previous synthetic identity malfeasance. In some embodiments, the synthetic indicator landing zone is updated based on the synthetic identity determination.

In some embodiments, the processing device is also configured to compare the one or more individual identifiers with one or more known real identifiers, the one or more known real identifiers being specific to the individual. In some embodiments, the at least one processing device is also configured to cause the transmission of the synthetic identity determination.

In some embodiments, the one or more individual identifiers include at least two of a name, a birthdate, an address, or an identification number of the individual. In some embodiments, the one or more known synthetic indicators include a combination of two or more individual indicators of one or more known synthetic identities.

In another example embodiment, a computer program product for detecting a synthetic identity is provided. The computer program product includes at least one non-transitory computer-readable medium having computer-readable program code portions embodied therein. The computer-readable program code portions include an executable portion configured to receive an identity verification request relating to an individual. The identity verification request includes one or more individual identifiers of the individual. The computer-readable program code portions also include an executable portion configured to compare at least one of the one or more individual identifiers to one or more known synthetic indicators. The one or more known synthetic indicators includes at least one of a synthetic identifier type or a synthetic identifier value that correspond to one or more known synthetic identities. The computer-readable program code portions further include an executable portion configured to determine a synthetic identity determination based on the comparison of the at least one of the one or more individual identifiers to the one or more known synthetic indicators. The synthetic identity determination indicates whether an identity verification request is a potential synthetic identity.

In some embodiments, the one or more known synthetic indicators are stored in a synthetic indicator landing zone. In such an embodiment, the synthetic indicator landing zone uses machine learning to create the one or more known synthetic indicators based on one or more previous synthetic identity malfeasance. In some embodiments, the synthetic indicator landing zone is updated based on the synthetic identity determination.

In some embodiments, the computer-readable program code portions also include an executable portion configured to compare the one or more individual identifiers with one or more known real identifiers. In such an embodiment, the one or more known real identifiers are specific to the individual. In some embodiments, the at least one processing device is also configured to cause the transmission of the synthetic identity determination.

In some embodiments, the one or more individual identifiers include at least two of a name, a birthdate, an address, or an identification number of the individual. In some embodiments, the one or more known synthetic indicators include a combination of two or more individual indicators of one or more known synthetic identities.

In still another example embodiment, a computer-implemented method for detecting a synthetic identity is provided. The method includes receiving an identity verification request relating to an individual. The identity verification request includes one or more individual identifiers of the individual. The method also includes comparing at least one of the one or more individual identifiers to one or more known synthetic indicators. The one or more known synthetic indicators includes at least one of a synthetic identifier type or a synthetic identifier value that correspond to one or more known synthetic identities. The method further includes determining a synthetic identity determination based on the comparison of the at least one of the one or more individual identifiers to the one or more known synthetic indicators. The synthetic identity determination indicates whether an identity verification request is a potential synthetic identity.

In some embodiments, the one or more known synthetic indicators are stored in a synthetic indicator landing zone. The synthetic indicator landing zone uses machine learning to create the one or more known synthetic indicators based on one or more previous synthetic identity malfeasance. In some embodiments, the synthetic indicator landing zone is updated based on the synthetic identity determination.

In some embodiments, the method also includes comparing the one or more individual identifiers with one or more known real identifiers. In such an embodiment, the one or more known real identifiers are specific to the individual. In some embodiments, the one or more individual identifiers include at least two of a name, a birthdate, an address, or an identification number of the individual. In some embodiments, the one or more known synthetic indicators include a combination of two or more individual indicators of one or more known synthetic identities.

Embodiments of the present disclosure address the above needs and/or achieve other advantages by providing apparatuses (e.g., a system, computer program product and/or other devices) and methods for dynamically generating optimized data queries to improve hardware efficiency and utilization. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Having thus described embodiments of the disclosure in general terms, reference will now be made the accompanying drawings, wherein:

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices. A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data.

To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

Increased security measures for identity verification has resulted in more sophisticated responses by bad actors attempting to circumvent such identity verification. Synthetic identities can be created using real and/or fake information, the intended goal is for the synthetic identities to appear real. Synthetic identities discussed herein can be created through identity manipulation, which incorporates some real information along with other non-real information to create a complete identity. Synthetic identity information can borrow from other real identities. For example, a synthetic identity may use a real address, but one that belongs to another person. Therefore, a synthetic identity is often difficult to detect using traditional verification methods. Currently, synthetic identities are often not detected until after said synthetic identity has committed a bad act (e.g., a synthetic identity may take out credit with no intention to pay back and no way to collect upon said credit by the institution).

Institutions and entities currently have information relating to past synthetic identity malfeasance that is not being implemented into identity verification screening. This information is often stored in various forms within each institution or subsection within an institution. Little to none of this information is being used to actively detect synthetic identities before malfeasance has occurred. Various embodiments of the present disclosure incorporate machine learning to incorporate past synthetic identity patterns and information into the identity verification process, along with already used methods of verification. The combination allows for increased synthetic identity detection and prevention of malfeasance by such synthetic identities.

Figure 1:
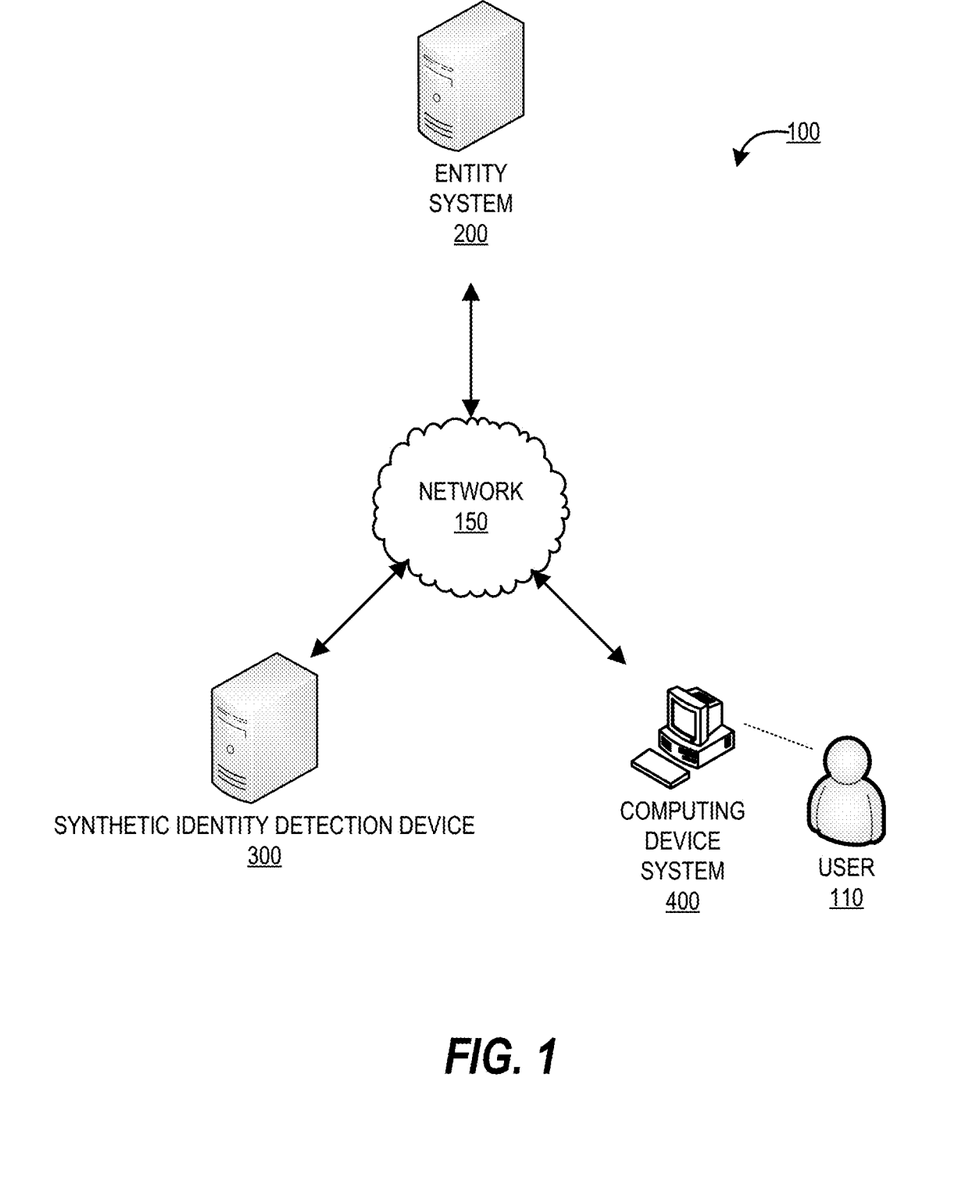
FIG. 1 provides a block diagram illustrating a system environment for detecting synthetic identities, in accordance with embodiments of the present disclosure.

FIG. 1 provides a block diagram illustrating a system environment 100 for dynamically generating optimized data queries to improve hardware efficiency and utilization, in accordance with an embodiment of the present disclosure. As illustrated in FIG. 1, the environment 100 includes a synthetic identity detection device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The synthetic identity detection device 300 is a system of the present disclosure for performing one or more process steps described herein. In some embodiments, the synthetic identity detection device 300 may be an independent system. In some embodiments, the synthetic identity detection device 300 may be a part of the entity system 200. For example, the method of FIG. 5 may be carried out by the entity system 200, the synthetic identity detection device 300, the computing device system 400, and/or a combination thereof.

The synthetic identity detection device 300, the entity system 200, and the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the synthetic identity detection device 300 is configured to communicate information or instructions with the entity system 200, and/or the computing device system 400 across the network 150. While the entity system 200, the synthetic identity detection device 300, and the computing device system 400 are illustrated as separate components communicating via network 150, one or more of the components discussed here may be carried out via the same system (e.g., a single system may include the entity system 200 and the synthetic identity detection device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the synthetic identity detection device 300, and/or entity system 200 across the network 150.

Figure 2:
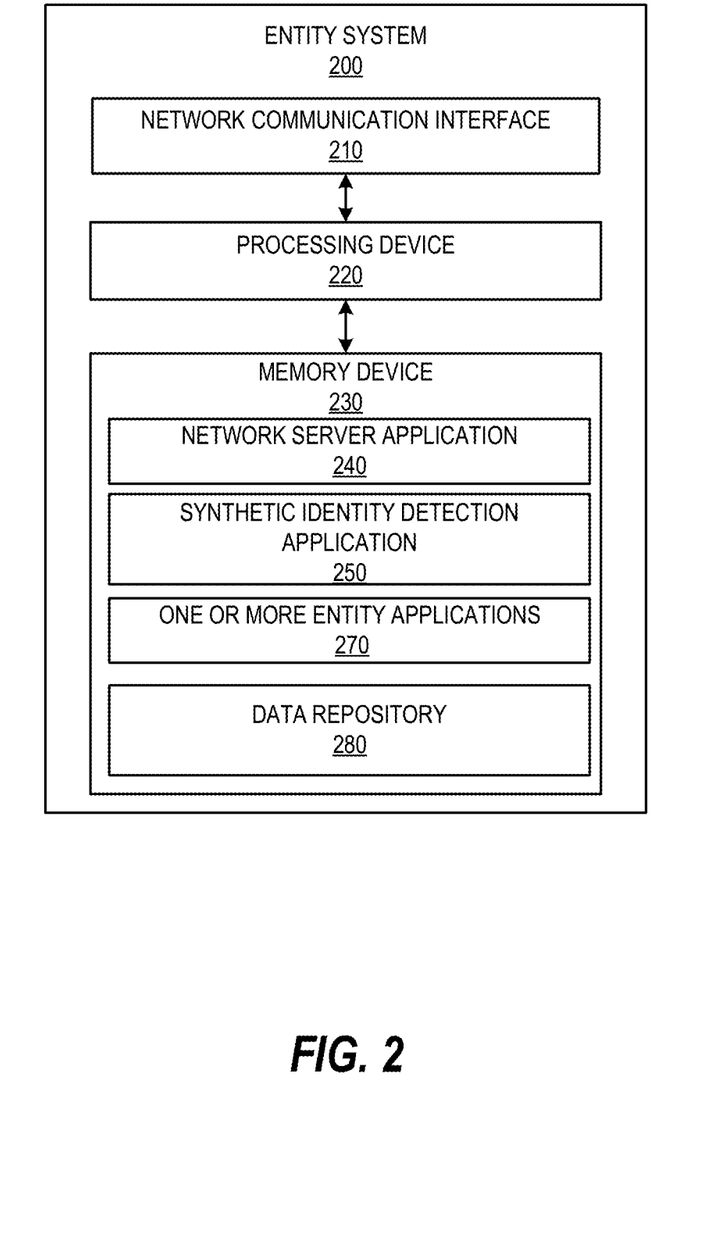
FIG. 2 provides a block diagram illustrating the entity system 200 of FIG. 1, in accordance with embodiments of the present disclosure.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a synthetic identity detection application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the synthetic identity detection application 250, the one or more entity application 270 to perform certain logic, data-extraction, and data-storing functions of the entity system 200 described herein, as well as communication functions of the entity system 200.

The network server application 240, the synthetic identity detection application 250, and the one or more entity applications 270 are configured to store data in the data repository 280 or to use the data stored in the data repository 280 when communicating through the network communication interface 210 with the synthetic identity detection device 300, and/or the computing device system 400 to perform one or more process steps described herein. In some embodiments, the entity system 200 may receive instructions from the synthetic identity detection device 300 via the synthetic identity detection application 250 to perform certain operations. The synthetic identity detection application 250 may be provided by the synthetic identity detection device 300. The one or more entity applications 270 may be any of the applications used, created, modified, facilitated, and/or managed by the entity system 200.

Figure 3:
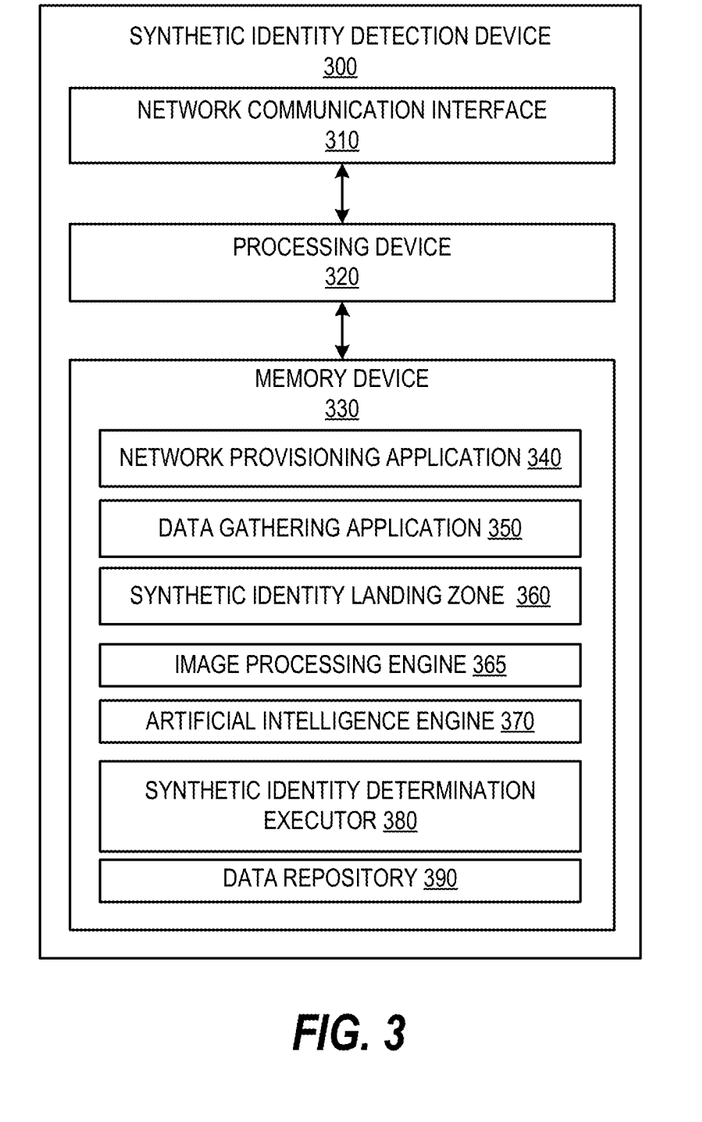
FIG. 3 provides a block diagram illustrating a synthetic identity detection device 300 of FIG. 1, in accordance with embodiments of the present disclosure.

FIG. 3 provides a block diagram illustrating the synthetic identity detection device 300 in greater detail, in accordance with various embodiments. As illustrated in FIG. 3, in one embodiment, the synthetic identity detection device 300 includes one or more processing devices 320 operatively coupled to a network communication interface 310 and a memory device 330. In certain embodiments, the synthetic identity detection device 300 is operated by an entity, such as a financial institution. In some embodiments, the synthetic identity detection device 300 is owned or operated by the entity of the entity system 200. In some embodiments, the synthetic identity detection device 300 may be an independent system. In alternate embodiments, the synthetic identity detection device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the synthetic identity detection device 300 described herein. For example, in one embodiment of the synthetic identity detection device 300, the memory device 330 includes, but is not limited to, a network provisioning application 340, a data gathering application 350, a synthetic identity landing zone 360, an image processing engine 365, an artificial intelligence engine 370, a synthetic identity determination executor 380, and a data repository 390 comprising any data processed or accessed by one or more applications in the memory device 330. The computer-executable program code of the network provisioning application 340, the data gathering application 350, the synthetic identity landing zone 360, the image processing engine 365, the artificial intelligence engine 370, and the synthetic identity determination executor 380 may instruct the processing device 320 to perform certain logic, data-processing, and data-storing functions of the synthetic identity detection device 300 described herein, as well as communication functions of the synthetic identity detection device 300.

The network provisioning application 340, the data gathering application 350, the synthetic identity landing zone 360, the image processing engine 365, the artificial intelligence engine 370, and the synthetic identity determination executor 380 are configured to invoke or use the data in the data repository 390 when communicating through the network communication interface 310 with the entity system 200, and/or the computing device system 400. In some embodiments, the network provisioning application 340, the data gathering application 350, the synthetic identity landing zone 360, the image processing engine 365, the artificial intelligence engine 370, and the synthetic identity determination executor 380 may store the data extracted or received from the entity system 200, and the computing device system 400 in the data repository 390. In some embodiments, the network provisioning application 340, the data gathering application 350, the synthetic identity landing zone 360, the image processing engine 365, the artificial intelligence engine 370, and the synthetic identity determination executor 380 may be a part of a single application.

Figure 4:
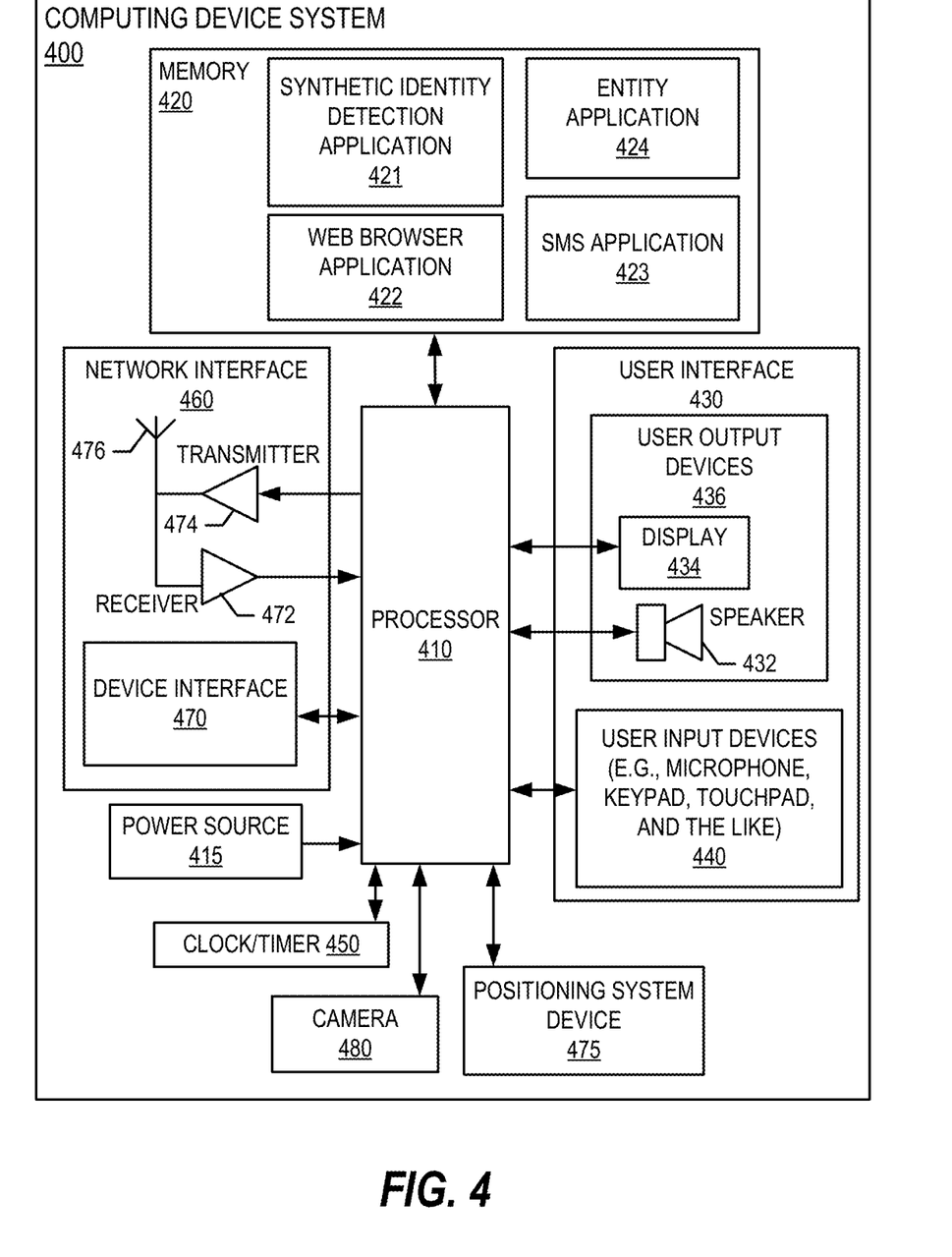
FIG. 4 provides a block diagram illustrating the computing device system 400 of FIG. 1, in accordance with embodiments of the present disclosure.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include a display 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a synthetic identity detection application 421, entity application 424. These applications also typically instructions to a graphical user interface (GUI) on the display 430 that allows the user 110 to interact with the entity system 200, the synthetic identity detection device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the synthetic identity detection application 421 provided by the synthetic identity detection device 300 allows the user 110 to access the synthetic identity detection device 300. In some embodiments, the entity application 424 provided by the entity system 200 and the synthetic identity detection application 421 allow the user 110 to access the functionalities provided by the synthetic identity detection device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

Figure 5:
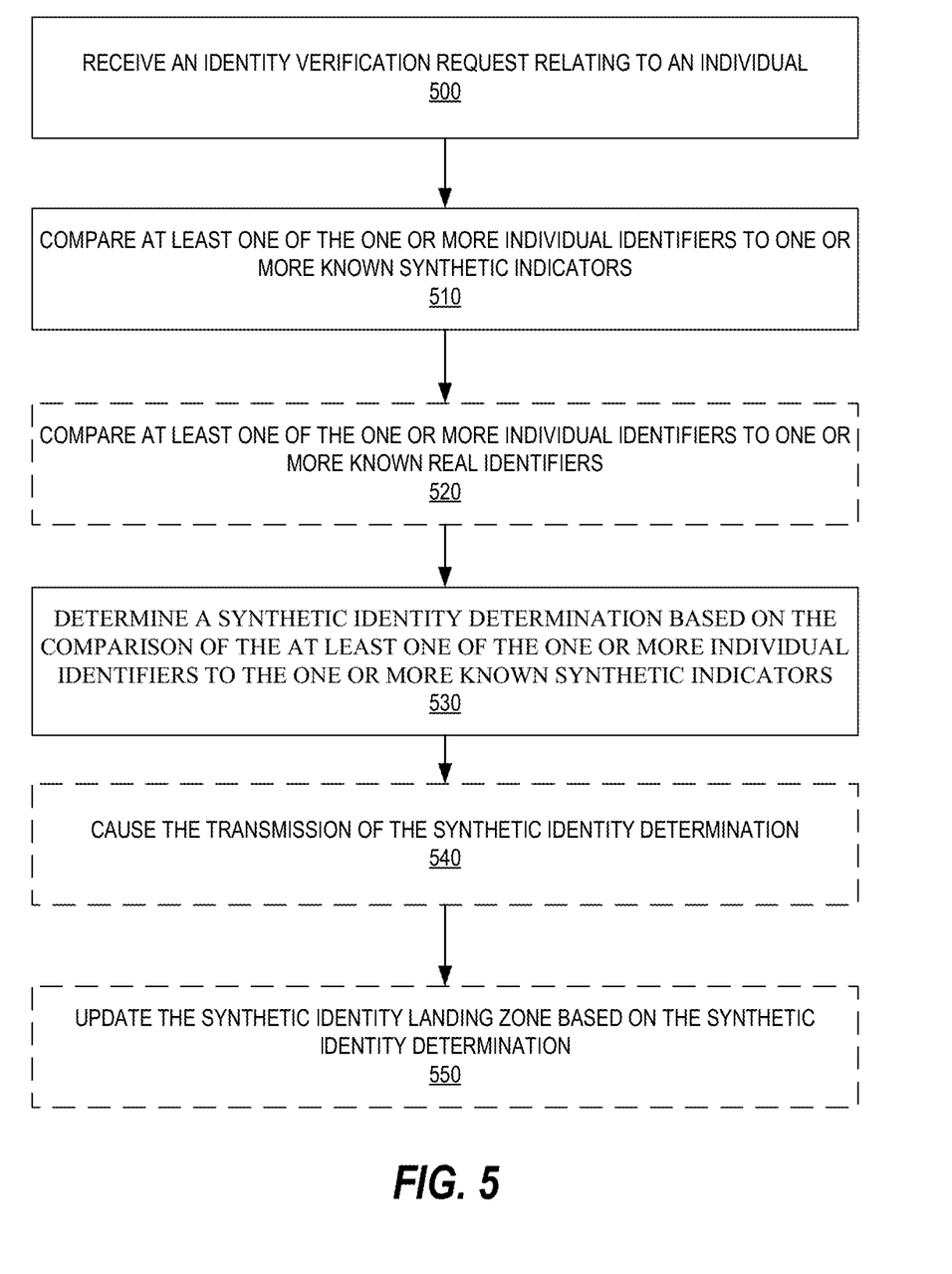
FIG. 5 provides a flowchart illustrating a method of detecting a synthetic identity in accordance with embodiments of the present disclosure.

Referring now to FIG. 5, a method of detecting a synthetic identity is provided. The method may be carried out by a system discussed herein (e.g., the entity system 200, the synthetic identity detection device 300, and/or the computing device system 400). An example system may include at least one non-transitory storage device and at least one processing device coupled to the at least one non-transitory storage device. In such an embodiment, the at least one processing device is configured to carry out the method discussed herein.

Referring now to Block 500 of FIG. 5, the method may include receiving an identity verification request relating to an individual. The identity verification request includes one or more individual identifiers of the individual. The identity verification request may be a part of a registration event. For example, the identity verification request may be completed in response to a request to open an account, a loan request, a transaction request, or any other request in which confirming identity is necessary or desired by one or both entities. The identity verification request includes one or more individual identifiers relating to the individual to which the identity is being verified. The one or more individual identifiers can be any information that relates to the given individual. Such an individual identifier can assist the identification of said individual. The one or more individual identifiers may be a name of the individual, a birthdate of the individual, an address of the individual, an identification number of the individual, or the like.

The number of individual identifiers provided in the identity verification request or requested to verify an identity to a certain confidence level can vary. There may be a hierarchy of individual identifiers in which one or more individual identifiers is more accurate in verifying an identity. For example, a social security number is more unique than a name and can therefore be given more weight in verifying an identity in some instances. Additionally, the combination of multiple individual identifiers can also assist in confirming a given identity and, in turn, detecting synthetic identities as discussed herein. Synthetic identities often have one or more real individual identifiers, that is individual identifiers that do exist (e.g., an address to a vacant lot for the residence of the synthetic identity) or belong to another person (e.g., a name or social security number of another person). Therefore, the identity verification request can have multiple identity identifiers to be used during the operations discussed herein in order to determine whether the identity is real or synthetic.

In some embodiments, in an instance in which the identity verification request does not have enough individual identifiers, the method may include causing a transmission requesting additional individual identifiers in order to carry out the operations herein. Such a transmission may be automatic (e.g., a user filling out an online application may not be able to submit a loan application unless said user includes specific individual identifiers). Alternatively, the transmission may be in the form of a message or notification to a user to provide additional information.

The necessary individual identifiers may be based on the desired confidence level of the real identity confidence level. For example, a lower value transaction may require fewer individual identifiers than a higher value transaction. A financial entity (or other entity seeking to have an identity verified) may set the level of value for one or more transactions. For example, a bank may indicate that the real identity confidence level may have a lower threshold for opening a checking account than the real identity confidence level for taking out a loan. Alternatively, the identity verification may be independent of the type of transaction or value. For example, the identity verification may be carried out the same regardless of transaction type or value (e.g., the same requirements for individual identifiers are used for any verification).

Referring now to Block 510 of FIG. 5, the method may include comparing at least one of the one or more individual identifiers to one or more known synthetic indicators. The one or more known synthetic indicators include at least one of a synthetic identifier type or a synthetic identifier value that correspond to one or more known synthetic identities. The synthetic identifier type refers to the category of individual identifier (e.g., name, date of birth, address, identification number, etc.). The synthetic identifier value refers to the specific value of a given synthetic identifier type (e.g., the specific name of a known synthetic identity). The known synthetic indicators can refer to specific synthetic identifier values (e.g., the name used in a previously discovered synthetic identity) and/or the synthetic identifier type (e.g., patterns or types of entries by the one or more previously discovered synthetic identities, but not the specific synthetic identifier value).

In various embodiment, the one or more synthetic indicators are stored in the synthetic indicator landing zone. The synthetic indicator landing zone uses machine learning to create the one or more known synthetic indicators based on one or more known synthetic identity malfeasance. The synthetic indicators can be specific individual identifiers of known synthetic identities. Additionally or alternatively, the synthetic indicators can be a pattern of multiple known synthetic identities. For example, a large number of synthetic identities may use a certain type of individual identifier that either alone, or in combination with other types of individual identifiers, create a pattern of known synthetic identities (e.g., synthetic identities may often provide certain individual identifiers, while not providing others). The synthetic indicator landing zone can be created and/or updated using third party data (e.g., data from multiple different companies or divisions of a company can be combined together to detect synthetic identities).

Referring now to optional Block 520 of FIG. 5, the method may include comparing at least one of the one or more individual identifiers to one or more known real identifiers. The one or more known real identifiers can be specific to the individual. The operations of Block 520 can be completed in conjunction with or separate to the comparison of Block 510. For example, the operations of Block 520 may be similar to traditional identity verification process in which the individual identifiers are compared to known information relating to the identity (e.g., information provided by credit bureaus or the like). Such a verification confirms that the identity being verified is a known identity but does not necessarily indicate that an identity is real (e.g., a synthetic identity can mirror a real identity, such that entities believe that synthetic identities are real and as such retain information relating to the same). As such, the operations of FIG. 5 can allow for both verification of an identity and also detection of synthetic identities simultaneously or in parallel, creating a streamlined process that increases security by reducing the number of synthetic identities approved.

Referring now to Block 530 of FIG. 5, the method may also include determining a synthetic identity determination based on the comparison of the at least one of the one or more individual identifiers to the one or more known synthetic indicators. The synthetic identity determination indicates whether an identity verification request is a potential synthetic identity. The synthetic identity determination may include a real identity confidence level (e.g., percentage probability of being a real or synthetic identity). Additionally or alternatively, the synthetic identity determination may have different threat levels of the potential synthetic identities. For example, the synthetic identity determination may indicate a high, medium, or low probability of the identity being synthetic.

The synthetic identity determination is based on the comparison of the individual identifier(s) and the known synthetic indicator(s). Said comparison may have multiple steps or operations. The individual identifier(s) may be compared to known synthetic identifier values for a one to one match (e.g., a previously discovered synthetic identity). For example, a synthetic user may be attempting to reuse a synthetic identity. In such an instance, if a match is found, then the synthetic identity determination may be that the identity is synthetic without requiring additional comparison. Additionally or alternatively, the individual identifier(s) may be analyzed based on the synthetic identifier types provided. The individual identifier(s) may also be analyzed for the pattern of individual identifiers (e.g., synthetic identities may be more likely to provide certain identifier types than real identities).

In some embodiments, the synthetic identity determination is based on the comparison of a combination of a plurality of individual identifiers and a plurality of known synthetic indicators. Such a comparison may be individual (e.g., each individual identifier may be compared to a given known synthetic indicator), or as a whole (e.g., the comparison may look at multiple different individual identifiers and known synthetic indicators and how such information consolidates together). In an instance in which the comparison is made as a whole, the comparison may look at times in which a synthetic identity entered a specific combination of individual identifiers and use such information to determine that an identity is synthetic. For example, synthetic identities may be known to use specific selections for a given combination of individual identifiers (e.g., many synthetic identities may use a certain state or address as a residence). Such information, combined with the other types of comparisons discussed herein allow for a higher confidence level in the synthetic identity determination.

In some embodiments, the determination of the synthetic identity determination includes requesting additional information from the user. The synthetic identity determination may include one or more individual identifiers that appear inaccurate or wrong. In such an instance, the user may be prompted to enter additional information and/or confirm information already entered. Such a request to the user may be before the determination of the synthetic identity determination. Additionally or alternatively, the synthetic identity determination may be updated upon receiving the information from the user. For example, the synthetic identity determination may indicate that the identity is likely synthetic, but request one or more additional individual identifier that can provide additional confidence to the synthetic identity determination (e.g., the additional individual identifier may make it more or less likely that an identity is synthetic).

Requesting additional individual identifier(s) may also occur earlier in the process outlined in FIG. 5 and discussed herein. For example, additional individual identifier(s) may be requested in response to the initial identity verification request (e.g., the identity verification request may be initially screened to ensure enough user information is included and additional information may be requested at that time).

Referring now to optional Block 540 of FIG. 5, the method may also include causing the transmission of the synthetic identity determination. The synthetic identity determination may indicate whether the given synthetic is real or synthetic. The transmission of the synthetic identity determination can be to the user being verified (e.g., a message indicating that the given user identity has been approved or rejected). Said message to a user may be in the form of a pop-up notification, an email, or the like. Additionally or alternatively, the synthetic identity determination may be transmitted to an entity other than the user being verified. For example, the synthetic identity determination may be transmitted to the entity seeking the identity verification. The synthetic identity determination may be transmitted to a processor (e.g., a signal indicating the synthetic identity determination may be transmitted to a processor) for additional processing (e.g., as a part of a larger approval process).

Referring now to optional Block 550 of FIG. 5, the method may also include updating the synthetic identity landing zone based on the synthetic identity determination. In various embodiments, the synthetic identity landing zone is updated continuously or periodically. The synthetic identity landing zone can be updated based on third party information (e.g., just as the synthetic identity landing zone is created, the updating may be based on information relating to discovered synthetic identity malfeasance). Additionally or alternatively, the synthetic identity landing zone can be updated based on the operations discussed herein. The synthetic identity determination, along with information relating to said synthetic identity determination (e.g., individual identifiers) may be provided to, and processed by, the synthetic identity landing zone. In some embodiments, the synthetic identity determination is transmitted to the synthetic identity landing zone upon determination that the given identity is likely synthetic (e.g., only synthetic identities are transmitted to the synthetic identity landing zone for processing). Alternatively, all of the synthetic identity determinations are transmitted to the synthetic identity landing zone (e.g., the synthetic identity landing zone may also be capable of using characteristics relating to real identities to assist in the synthetic identity determination).

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for detecting a synthetic identity, the system comprising:
   at least one non-transitory storage device; and
   at least one processing device coupled to the at least one non-transitory storage device, wherein the at least one processing device is configured to:
   receive an identity verification request relating to an individual, wherein the identity verification request comprises one or more individual identifiers of the individual;
   determine a confidence level of an identity verification based on the identity verification request;
   determine a location of a user device associated with the identity verification request via a positioning system, wherein the positioning system comprises cellular signal triangulation and an RFID tag to detect merchant location proximity;
   compare at least one of the one or more individual identifiers to one or more known synthetic indicators, wherein the one or more known synthetic indicators comprises a synthetic identifier type and a synthetic identifier value that correspond to one or more known synthetic identities, wherein the one or more known synthetic indicators are a pattern of the one or more known synthetic identities and are stored in a synthetic indicator landing zone;
   based on the confidence level, the one or more individual identifiers, and the one or more known synthetic indicators, generate a request for an additional individual identifier relating to the individual and receive the additional individual identifier;

compare the one or more individual identifiers and the additional individual identifier to one or more known real identifiers in conjunction with comparing the at least one of the one or more individual identifiers to the one or more known synthetic indicators;

based on the comparison of the at least one of the one or more individual identifiers and the additional individual identifier to the one or more known synthetic indicators, determine a synthetic identity determination, wherein the synthetic identity determination indicates whether an identity verification request is a potential synthetic identity;

based on the synthetic identity determination, create a synthetic identity threat level;

cause a transmission of the synthetic identity determination and the synthetic identity threat level; and update the synthetic indicator landing zone based on the synthetic identity determination, wherein the synthetic indicator landing zone is updated continuously based on third party information and information relating to discovered synthetic identity malfeasance.

2. The system of claim 1, wherein the synthetic indicator landing zone uses machine learning to create the one or more known synthetic indicators based on one or more previous synthetic identity malfeasance.

3. The system of claim 2, wherein the synthetic indicator landing zone is updated based on the synthetic identity determination.

4. The system of claim 1, wherein the processing device is also configured to compare the one or more individual identifiers with one or more known real identifiers, wherein the one or more known real identifiers are specific to the individual.

5. The system of claim 1, wherein the one or more individual identifiers include at least two of a name, a birthdate, an address, or an identification number of the individual.

6. The system of claim 1, wherein the one or more known synthetic indicators include a combination of two or more individual indicators of one or more known synthetic identities.

7. A computer program product for detecting a synthetic identity, the computer program product comprising at least one non-transitory computer-readable medium having computer-readable program code portions embodied therein, the computer-readable program code portions comprising:

an executable portion configured to receive an identity verification request relating to an individual, wherein the identity verification request comprises one or more individual identifiers of the individual;

an executable portion configured to determine a confidence level of an identity verification based on the identity verification request;

an executable portion configured to determine a location of a user device associated with the identity verification request via a positioning system, wherein the positioning system comprises cellular signal triangulation and an RFID tag to detect merchant location proximity;

an executable portion configured to compare at least one of the one or more individual identifiers to one or more known synthetic indicators, wherein the one or more known synthetic indicators comprises a synthetic identifier type and a synthetic identifier value that correspond to one or more known synthetic identities, wherein the one or more known synthetic indicators are a pattern of the one or more known synthetic identities and are stored in a synthetic indicator landing zone;

an executable portion configured to generate a request for an additional individual identifier relating to the individual based on the confidence level, the one or more individual identifiers, and the one or more known synthetic indicators and receive the additional individual identifier;

an executable portion configured to compare the one or more individual identifiers and the additional individual identifier to one or more known real identifiers in conjunction with comparing the at least one of the one or more individual identifiers to the one or more known synthetic indicators;

an executable portion configured to determine a synthetic identity determination based on the comparison of the at least one of the one or more individual identifiers to the one or more known synthetic indicators, wherein the synthetic identity determination indicates whether an identity verification request is a potential synthetic identity;

an executable portion configured to create a synthetic identity threat level based on the synthetic identity determination;

an executable portion configured to cause a transmission of the synthetic identity determination and the synthetic identity threat level; and an executable portion configured to update the synthetic indicator landing zone based on the synthetic identity determination, wherein the synthetic indicator landing zone is updated continuously based on third party information and information relating to discovered synthetic identity malfeasance.

8. The computer program product of claim 7, wherein the synthetic indicator landing zone uses machine learning to create the one or more known synthetic indicators based on one or more previous synthetic identity malfeasance.

9. The computer program product of claim 8, wherein the synthetic indicator landing zone is updated based on the synthetic identity determination.

10. The computer program product of claim 7, wherein the computer-readable program code portions include an executable portion configured to compare the one or more individual identifiers with one or more known real identifiers, wherein the one or more known real identifiers are specific to the individual.

11. The computer program product of claim 7, wherein the one or more individual identifiers include at least two of a name, a birthdate, an address, or an identification number of the individual.

12. The computer program product of claim 7, wherein the one or more known synthetic indicators include a combination of two or more individual indicators of one or more known synthetic identities.

13. A computer-implemented method for detecting a synthetic identity, the method comprising:

receiving an identity verification request relating to an individual, wherein the identity verification request comprises one or more individual identifiers of the individual;

determining a confidence level of an identity verification based on the identity verification request;

determining a location of a user device associated with the identity verification request via a positioning system, wherein the positioning system comprises cellular signal triangulation and an RFID tag to detect merchant location proximity;

comparing at least one of the one or more individual identifiers to one or more known synthetic indicators, wherein the one or more known synthetic indicators comprises a synthetic identifier type and a synthetic identifier value that correspond to one or more known synthetic identities, wherein the one or more known synthetic indicators are a pattern of the one or more known synthetic identities and are stored in a synthetic indicator landing zone;

based on the confidence level, the one or more individual identifiers, and the one or more known synthetic indicators, generating a request for an additional individual identifier relating to the individual and receiving the additional individual identifier;

comparing the one or more individual identifiers and the additional individual identifier to one or more known real identifiers in conjunction with comparing the at least one of the one or more individual identifiers to the one or more known synthetic indicators;

based on the comparison of the at least one of the one or more individual identifiers and the additional individual identifier to the one or more known synthetic indicators, determining a synthetic identity determination, wherein the synthetic identity determination indicates whether an identity verification request is a potential synthetic identity;

based on the synthetic identity determination, creating a synthetic identity threat level;

causing a transmission of the synthetic identity determination and the synthetic identity threat level; and updating the synthetic indicator landing zone based on the synthetic identity determination, wherein the synthetic indicator landing zone is updated continuously based on third party information and information relating to discovered synthetic identity malfeasance.

14. The computer-implemented method of claim 13, wherein the synthetic indicator landing zone uses machine learning to create the one or more known synthetic indicators based on one or more previous synthetic identity malfeasance.

15. The computer-implemented method of claim 14, wherein the synthetic indicator landing zone is updated based on the synthetic identity determination.

16. The computer-implemented method of claim 13, further comprising comparing the one or more individual identifiers with one or more known real identifiers, wherein the one or more known real identifiers are specific to the individual.

17. The computer-implemented method of claim 13, wherein the one or more individual identifiers include at least two of a name, a birthdate, an address, or an identification number of the individual.

18. The computer-implemented method of claim 13, wherein the one or more known synthetic indicators include a combination of two or more individual indicators of one or more known synthetic identities.

* * * * *